United States Patent [19]

Miura

[11] Patent Number: 4,745,266

[45] Date of Patent: May 17, 1988

[54] BILL BUNDLE DRAWING OUT APPARATUS

[75] Inventor: Yoshifumi Miura, Urawa, Japan

[73] Assignee: Laurel Bank Machines Co., Ltd., Tokyo, Japan

[21] Appl. No.: 906,910

[22] Filed: Sep. 15, 1986

[30] Foreign Application Priority Data

Sep. 25, 1985 [JP] Japan ........................... 60-146500[U]
Jul. 8, 1986 [JP] Japan ........................... 61-104519[U]

[51] Int. Cl.[4] ........................ G06F 15/30; B65G 59/00

[52] U.S. Cl. .................................... 235/379; 221/129; 271/9; 271/13

[58] Field of Search ................ 235/379, 381; 221/129, 221/13, 21; 271/9, 35, 11, 98

[56] References Cited

U.S. PATENT DOCUMENTS 4,017,004 4/1977 Onoe et al. ............................ 271/9
4,363,584 12/1982 Kokubo ................................. 271/9
4,462,506 7/1984 Ohba ................................. 271/35 X
4,591,070 5/1986 Wirstlin ............................... 221/129
4,699,272 10/1987 Kokubo et al. ...................... 235/379

FOREIGN PATENT DOCUMENTS 57-81691 5/1982 Japan .

*Primary Examiner*—Roy N. Envall, Jr.
*Attorney, Agent, or Firm*—Fleit, Jacobson, Cohn & Price

[57] ABSTRACT

Storage boxes are provided in a bundle-and-bar money paying machine and arranged to be stacked one on another. Some of the storage boxes store bill bundles as stacked in a horizontal direction. An elevator is provided for moving vertically. Slide blocks are movably provided on slide guide shafts positioned between the elevator and the storage boxes. Each slide block is constructed so that bill bundles are discharged into the elevator in cooperation with the elevator.

2 Claims, 5 Drawing Sheets

BILL BUNDLE DRAWING OUT APPARATUS

BACKGROUND OF THE INVENTION

This invention relates to a bill bundle drawing out apparatus for being installed to bill bundle paying machines.

Heretofore, wholesalers of banks and the like have been provided with bill bundle drawing out apparatus allowing bill bundles to be stored therein with different kinds being classified and to be drawn out as required.

Such an bill bundle drawing out apparatus has, for example, the following functions: bill bundles are stored in a plurality of storage boxes with different bill kinds being classified; and the bill bundles are fed from each of the storage boxes to conveyor means, such as an elevator, installed near the storage boxes so that the bill bundles with the desired amount of money with the desired set of bill kinds are collected in the elevator.

The bill bundle drawing out apparatus is required to store the most bill bundles possible therein to reduce the number of the bill bundle replenishment operations. However, it is required, for effecting the automatic drawing out of the bill bundles, to secure the spaces for the drawing out mechanism, the driving motors and the like in the machine at the sacrifice of the capacities of the storage boxes, i.e. by limiting the sizes of the storage boxes.

Furthermore, it is required for the drawing out mechanism provided to each of the storage boxes to have the function that when drawing out the desired kind of the bill bundle, other kinds of bill bundles are securely prevented from drawn out.

SUMMARY OF THE INVENTION

It is, therefore, an object of the invention to provide a bill bundle drawing out apparatus allowing the mechanism for drawing out the bill bundles from the storage boxes to be simplified so that the space within the machine is effectively utilized.

According to the invention, there is provided a bill bundle drawing out apparatus comprising: an elevator provided in front of storage boxes adapted for storing bill bundles; slide blocks provided between the elevator and the storage boxes, the slide blocks being driven by a belt for vertical movements; discharge blocks provided to pivot shafts pivotally provided to the slide blocks; and discharge block rollers adapted for being brought into contact with the elevator so as to regulate rotation of the pivot shafts.

DESCRIPTION OF THE DRAWINGS

The present invention will now be described in detail with reference to the presently preferred embodiment illustrated in the accompanying drawings in which.

DESCRIPTION OF THE PREFERRED EMBODIMENT

Figure 1:
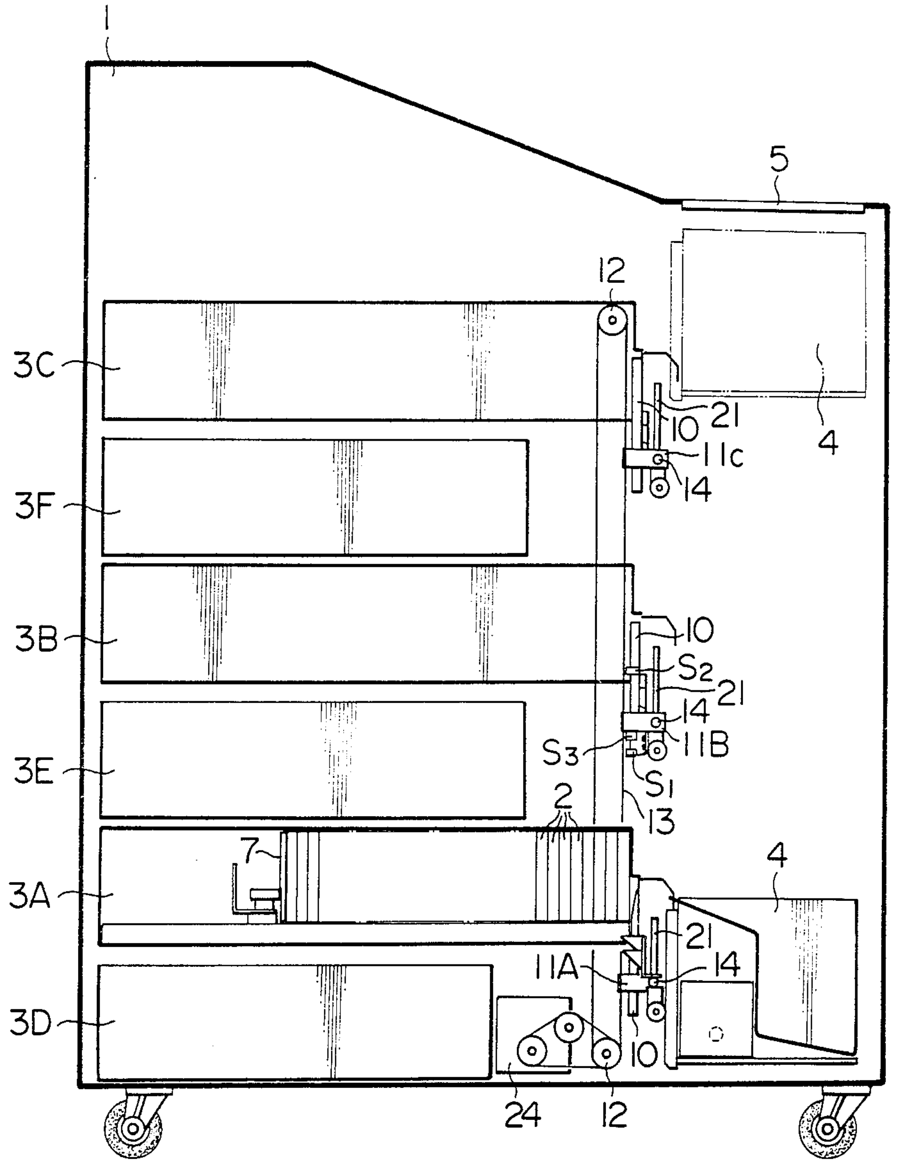
FIG. 1 is a side view of the entire machine.

The present invention will now be described in detail by referring to the embodiment shown in the accompanying drawings.

In the drawings, the reference numeral 1 denotes a machine body which is provided with storage boxes 3A–3C for storing bill bundles 2 and cassette cases (not shown) for storing coin packs, the storage boxes and cassette cases being plural in number, arranged above and below one another and drawable horizontally. The machine body 1 is further provided with a vertically movable elevator 4. The elevator 4 is provided with a guide surface 4*c* which guides the bill bundles 2 into a storing space 4*b* at the bottom of the elevator 4. The elevator 4a is vertically moved while being positioned at, for example, eleven levels, sò as to be lifted while receiving the bundle-and-bar money from the ten cassette cases (not shown) piled vertically at ten levels and from the three storage boxes 3A–3C which may be positioned at the same levels as certain levels of the cassette cases, for example the first, fifth and ninth levels, and so as to reach the uppermost level facing a payment opening 5.

Figure 2:
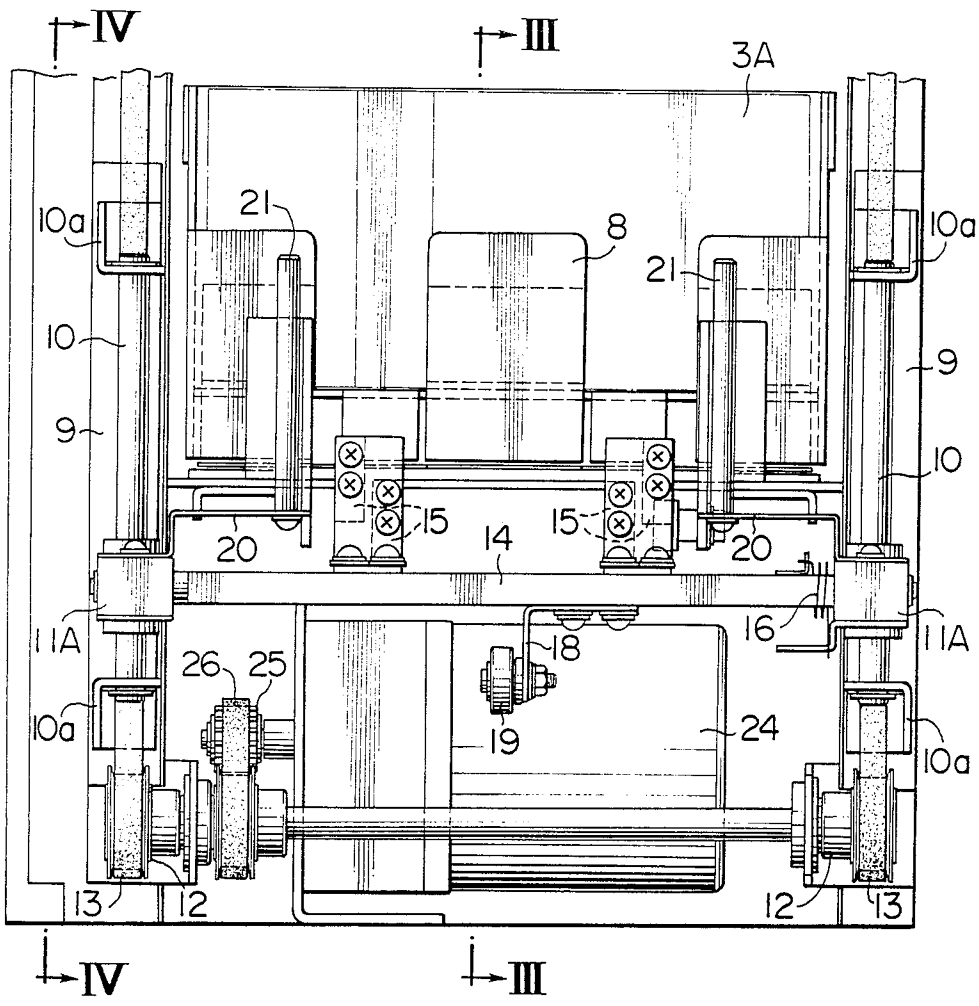
FIG. 2 is a front view of the essential portion.

As shown in FIG. 1, the storage boxes 3A—3C are to store the bill bundles with different kinds being classified (for example for 1,000-yen bills, 5,000-yen bills and 10,000-yen bills in order from the bottom). The bill bundles 2 are stored in the storage boxes 3A–3C while being directed and piled to the horizontal direction. The storage boxes 3A–3C are horizontaly supported by guides 6 horizontally provided to the machine body 1. Each of the storage boxes 3A–3C is provided with a horizontally movable pushing plate 7 which biases the bill bundles 2 horizontally. Furthermore, each of the storage boxes 3A–3C is opened at its top surface at least at the fore end portion (right end portion in FIG. 1), and is provided at its front surface with a front plate 8 a height of which is one-half of that of the bill bundle 2 (a vertical size in FIG. 2). The front plate 8 confines the forward movement of the bill bundles 2. In addition, in the spaces above and below the storage boxes 3A–3C are provided spare storage drawers 3D–3F for storing spare coin packs, spare bill bundles and the like, so that the space within the machine is effectively utilized.

Figure 5:
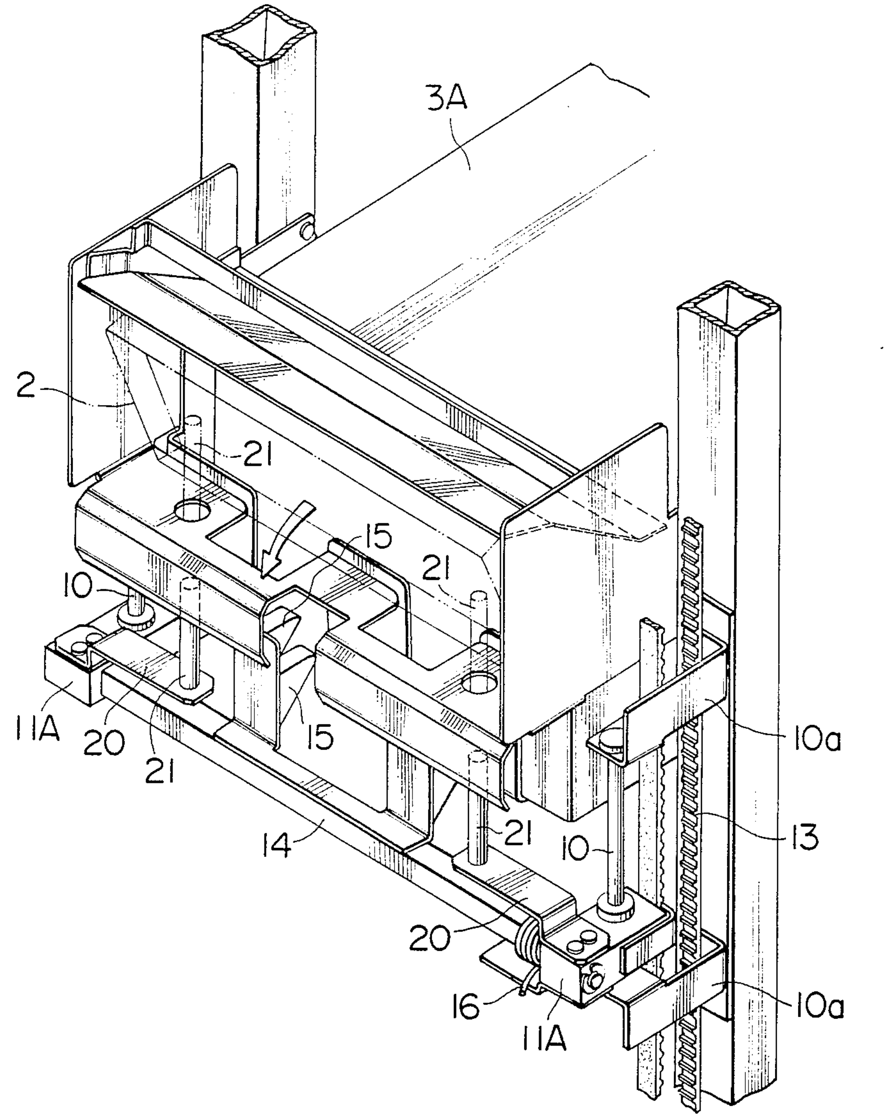
FIG. 5 is a perspective view showing a slide block.

The machine body 1 is further provided therein in front of the storage boxes 3A–3C with vertical slide guide shafts 10 supported by body stays 9 which are vertically provided within the machine body 1. The slide guide blocks are attached through their support brackets 10*a* and 10*a* at upper and lower ends to the body stays 9. Slide blocks 11A–11C are axially movably supported by the slide guide shafts 10. The body stays 9 are provided near their upper and lower ends with pulleys 12, 12. Belts 13 are wound around the pulleys 12, 12 so as to run between the pulleys 12, 12. The slide blocks 11A–11C are respectively connected to the belts 13 (as shown in FIG. 5, which are cogged belts for positive transmission of driving face) so as to effect the vertical movements according to the running of the belts 13.

Figure 3:
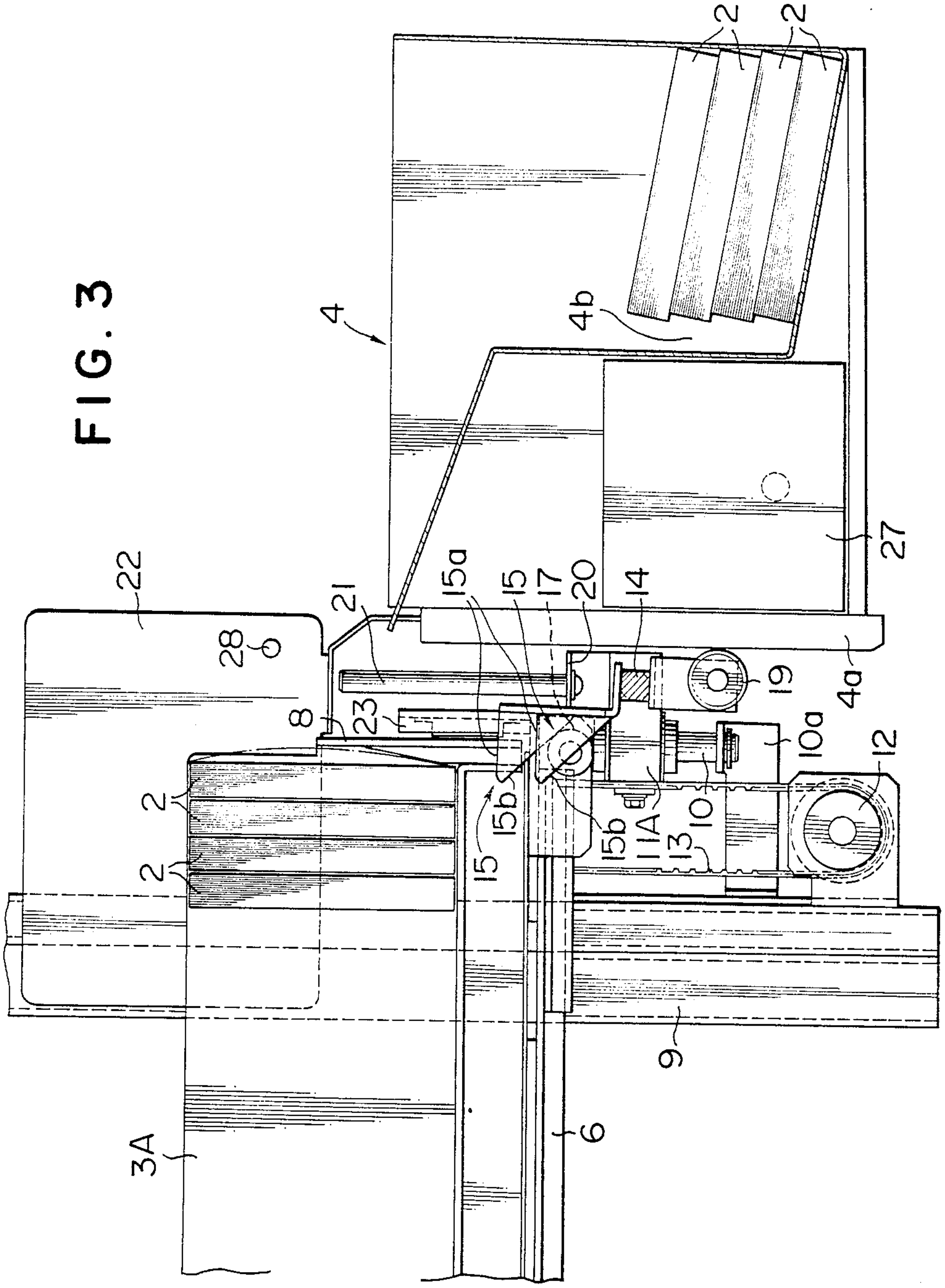
FIG. 3 is a view taken along line III—III in FIG. 2.

Each pair of the slide blocks 11A–11C are provided with a rotatable pivot shaft 14 arranged horizontally. The pivot shaft 14 supports discharge blocks 15 adapted for being brought into contact with the bottom surface of the bill bundle 2 in the storage boxes 3A–3C to push it upward. The pivot shaft 14 is biased by a torsion spring 16 so that the discharge block 15 is intended to rotate anticlockwise in FIG. 3. As shown in FIG. 3, the discharge block 15 is formed with a bill pushing surface 15*a* adapted for being brought into contact with the bottom surface of the bill bundle 2, and an inclined surface 15*b* adapted for sliding on a block return roller 17 provided in front of the guide 6. The inclined surface **15*b*** pressed against the block return roller 17 by the downward movement of each of the slide blocks 11A–11C, so that the discharge block 15 is pivotally moved against the biasing force to make the bill pushing surface 15*a* horizontal. Each of the pivot shaft 14 is provided with two discharge blocks 15 the bill pushing surfaces 15*a* of which are different in vertical levels from each other.

The pivot shaft 14 is further provided with a confining arm 18 which is rotatable integrally with the pivot shaft 14. At the end of the confining arm 18 is fixed a discharge block roller 19 which is brought into contact with a confining member 4*a* provided on the front surface of the elevator 4 to confine the rotation of the pivot shaft 14 when the elevator 4 is in a certain position, that is the position allowing the elevator 4 to receive the bill bundle 2 discharged from the storage box 3A (or 3B, or 3C).

Furthermore, support arms 20 are horizontally provided on the slide blocks 11A–11C, and bill support block 21 is vertically attached to each of the support arms 20 so that the support block 21 is vertically movable together with the slide blocks 11A or 11C.

In addition, the reference numeral 22 denotes a discharge guide for preventing the bill bundle 2 pushed upward from the storage boxes 3A–3C from falling toward the side; 23 denotes a storage box stop which is brought into contact with the front surface of each of the storage boxes 3A–3C to horizontally position, the storage boxes being attracted by magnets and fixed; 24 denotes a discharge motor which drives the lower belt pulleys 12 through a pulley 25 and a belt 26; 27 denotes a coin discharge motor which acts on the cassette case storing coin packs therein to discharge the coin packs; and 28 denotes a bill discharge count sensor such as photosensor which operates every time the bill bundle 2 is discharged from the storage boxes 3A–3C.

The slide guide shaft 10 at the second level from the bottom in FIG. 1 is provided with three sensors: an off-position sensor $S_1$, a discharge-position sensor $S_2$, and a repeating-discharge-position sensor $S_3$. The discharge motor 24 is driven for rotation in response to the signals from the three sensors. The sensors $S_1$–$S_3$ may be photosensors which are changed in condition between the light-passing condition and the light-blocked condition according to the vertical movement of the slide block 11B, to sense the position of the slide block 11B. It should be noted that the other two slide blocks 11A and 11C than the slide block 11B are fixed to the belt 13 with certain distances from the slide block 11B, so that sensing the position of the one slide block 11B allows the positions of the other slide blocks 11A and 11C to be found.

There will next be described the operation of the sensors $S_1$–$S_3$ together with the operation of the drawing out apparatus, noting that in the following description the term "H" represents the light-blocked condition and the term "L" represents the light-passing condition.

(1) In the off condition before the money paying order which orders an amount of money and a set of money kinds, the block return roller 17 presses the inclined surface 15*b* of the discharge block 15 to maintain the bill pushing surface 15*a* at the horizontal position as shown in FIG. 3. The belt 13 has been moved to such a position that the bill pushing surface 15*a* is in a position below the bottom surface of the bill bundle 2. In this case, the off-position sensor $S_1$ is in "H". The elevator 4 is on standby at the lowermost position.

(2) Taking the money paying order, the elevator 4 starts to rise and stops in front of the lowermost storage box 3A. The discharge block 15 between the elevator 4 which has stopped and the storage box 3A is so positioned that the discharge block roller 19 integral with the pivot shaft 14 supporting the discharge block 15 is brought into contact with the confining member 4a of the elevator 4. Thus, there is prevented the anticlockwise (in FIGS. 3 and 4) pivotal movement of the discharge block 15. When the discharge motor 24 is operated after the elevator 4 stops, the slide blocks 11A–11C are lifted by the belt 13, so that the discharge blocks 15 supported by the slide blocks are also lifted together with them. (Hereafter, the rotation of the discharge motor 24 in such a direction that the slide blocks are lifted is called forward rotation, whereas the rotation for the downward movement is called reverse rotation.)

Figure 4:
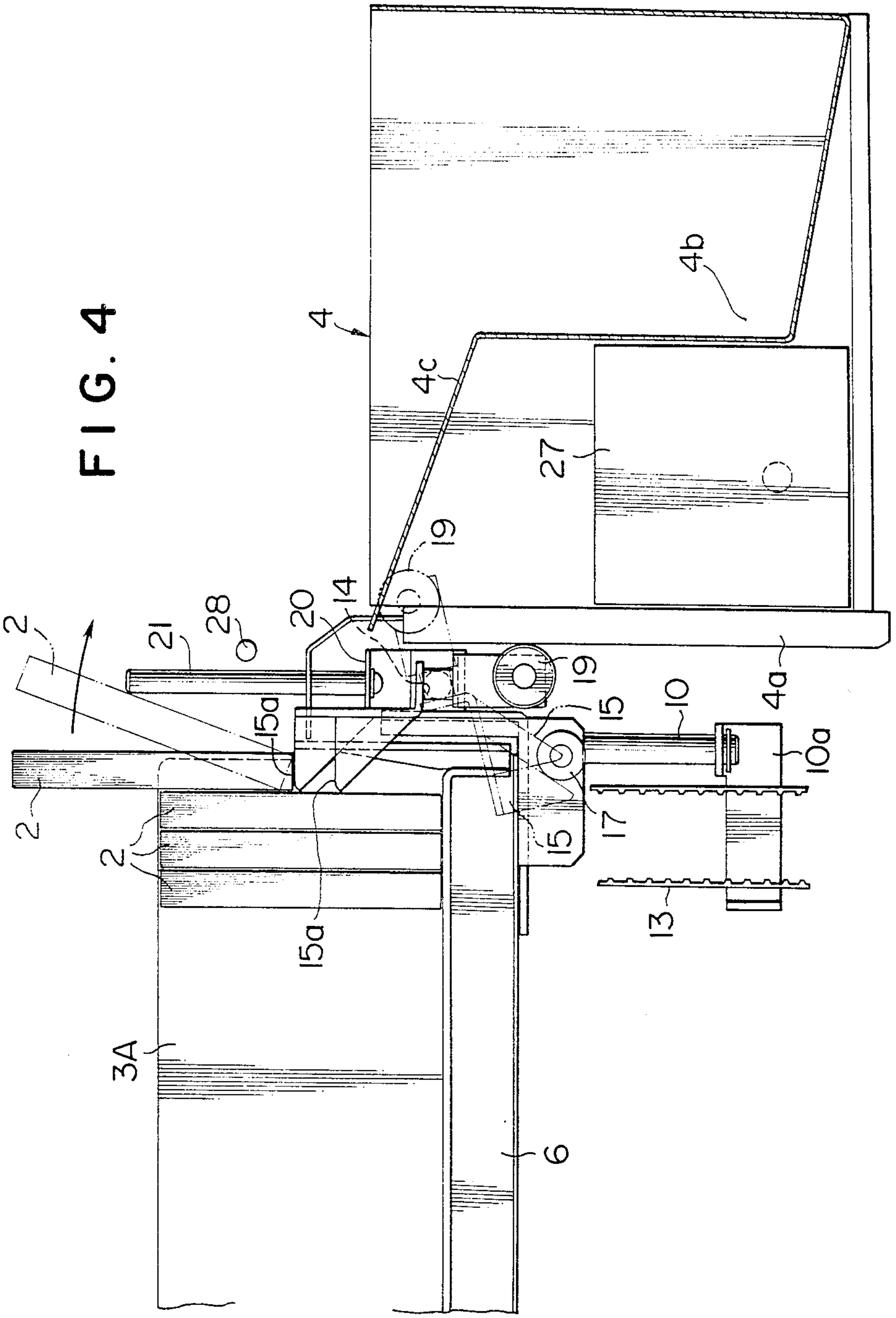
FIG. 4 is a view taken along line IV—IV in FIG. 2.

(3) Each of the discharge blocks 15 is lifted toward the bottom surface of the bill bundle 2. Note that the discharge blocks 15 supported by the slide blocks 11B and 11C are lifted while the block return roller 17 is stationary, so that these discharge blocks are pivotally moved downward as indicated by chain lines in FIG. 4 by the anticlockwise rotary moment acting on the pivot shaft 14. Accordingly, the slide blocks 11B and 11C cannot lift the bill bundles up, and therefore no bill bundle 2 is discharged from the storage boxes 3B and 3C. On the other hand, the discharge blocks 15 supported by the slide block 11A are confined in pivotal movement as previously described, so that the bill pushing surfaces 15*a* of these discharge blocks 15 are maintained at the horizontal positions. Accordingly, the rise of the slide block 11A allows the bill pushing surface 15*a* to push upward the bottom surface of the bill bundle 2. As the slide block 11A rises, the bill bundle 2 is pushed upward to a level above the top end of the front plate 8, and pushed rightward in FIG. 4 by the biasing force of the pressing plate 7 provided in the storage box 3A to be fed into the elevator 4. Meanwhile, the support blocks 21 supported by the slide block 11A project upward in response to the lift of the slide block 11A (that is, the lift of the bill bundle) and support the bill bundle, which has risen above the front plate 8, in an inclined condition as shown in dotted lines of FIG. 4. When the slide block 11A is lifted beyond the level allowing the bill bundle 2 to be discharged, the discharge sensor $S_2$ is changed in condition from "L" to "H". As the result, the bill discharge motor 22 starts to effect the reverse rotation, so that the slide blocks 11A–11C are lowered until the off-position sensor $S_1$ becomes "H" and finally the slide blocks stop. The support blocks 21 move downward in accordance with the downward movement of the slide block 11A. The movement of the support blocks 21 allows the bill bundle 2 to be slowly turned over as shown in FIG. 4 and to be received in the elevator 4. When the bills in bundle are new notes, the bundle does not have a tendency of expansion, while when the bills in bundle are circulating notes with folding lines, the bundle has a tendency of expansion. According to the present invention, when the bill bundles 2 made of the circulating notes having a tendency of expansion are stored in the storage box 3A in a compressed condition and then are taken out, the support block 21 supports the bill bundle, as shown in FIG. 4. Consequently, even if the bundle jumps up a dances due to release from the compressed condition, the bundle is prevented from dropping in the elevator in an undesired posture. After the support block 21 supports the bill bundle, the support block 21 is lowered slowly together with the movement of the slide block 11A and therefore the bundle is slowly turned down and then transfered into the storage space **4*b* in a stable state, while guided by the guide surface 4C. The discharge blocks 15, which are installed to the slide blocks 11B and 11C and pivotally moved downward when lifting, are returned to the positions allowing the bill pushing surfaces 15*a* to become horizontal by the action that the block return roller 17 presses the inclined surfaces 15*b* while the discharge blocks 15 is being lowered. Since the two discharge blocks 15 are arranged with the different levels for each of the pivot shaft 14, if the bill bundle 2 falls from the upper discharge block 15 because of folded or bent bills, the lower discharge block 15 can catch the fallen bill bundle 2** and discharge it.

(4) Together with the drawing out operation for the bill bundles 2 described above, or before or after such an operation, coin packs may be drawn out from the cassette case (not shown) disposed at the same level as the storage box 3A. Thereafter, the elevator 4 is lifted to a level where there exist the cassette case or the storage box for the ordered kinds of money; the bill bundle 2 is discharged in the same manner as the above mentioned case.

(5) After the desired coin packs and the bill bundles are collected in the elevator 4, the elevator 4 is lifted to the uppermost level to complete one drawing out operation.

In addition, if a plurality of the bill bundles 2 of the same kind are required, the following operation is carried out. In the above step (3), after the discharge-position sensor $S_2$ becomes "H", the discharge motor 22 is driven for reverse rotation unitl the repeating-position sensor $S_3$ becomes "H"; after the repeating-position sensor $S_3$ becomes "H", the discharge motor 22 is driven for normal rotation again. These steps are repeated until the desired number of the bill bundles 2 are discharged into the elevator 4.

It should be noted that the discharge blocks are not necessarily two in number: one discharge block may be used or three or more discharge blocks with different levels may be used for each of the pivot shaft 14. The locations of the storage boxes are, of course, not limited to the first, fifth and ninth levels as described for the above embodiment.

As can be seen from the above description, since the present invention provides a bill bundle drawing out apparatus comprising: an elevator provided in front of storage boxes adapted for storing bill bundles; slide blocks provided between the elevator and the storage boxes, the slide blocks being driven by one belt for vertical moments together with each other; discharge blocks provided to pivot shafts pivotally provided to the slide blocks; and discharge block rollers adapted for being brought into contact with the elevator so as to regulate rotation of the pivot shafts, to following effects are obtained: the slide blocks are driven by one driver; the bill bundle is discharged from only the storage box exisitng where the elevator stops; and since sensing the position of one slide block allows the positions of the other slide blocks to be found, a reduced number of the sensors are required for sensing the position of each of the slide blocks during the bill bundle discharge operation, so that the control mechanism is simplified.

What we claim is:

1. A bill bundle drawing out apparatus comprising: a plurality of storage boxes provided to a machine body of a bundle-and-bar money paying machine, the storage boxes being arranged above and below one another and adapted for storing bill bundles stacked in a horizontal direction; an elevator vertically movably provided in front of the storage boxes; slide guide shafts vertically provided between the elevator and the storage boxes; pivot shafts horizontally provided to slide blocks which are supported by the slide guide shafts and movable along the slide guide shafts; discharge blocks pivotally provided around the pivot shafts, the discharge blocks being adapted for pushing out upward the bill bundle from the storage boxes while moving upward together with the slide blocks, each of the discharge blocks being formed with a bill pushing surface adapted for being brought into contact with a bottom surface of the bill bundle and an inclined surface adapted for sliding on a block return roller when the discharge block is lowered together with the slide blocks so as to allow the bill pushing surface to be directed upward, each of the discharge blocks being biased in a direction allowing the inclined surface to be pressed against the block return roller; and discharge block rollers provided to confining arms rotatable integrally with the pivot shafts, each of the discharge block roller being adapted for being brought into contact with a part of the elevator when the elevator is in a certain position so as to confine a pivotal movement of the discharge block.

2. A bill bundle drawing out apparatus according to claim 1, wherein said slide block is provided with upstanding support blocks for preventing the bill bundle, which has been pushed out from the storage box, from dropping into the elevator, by supporting the bill bundle.

* * * * *